UNITED STATES PATENT OFFICE

CALVIN PECK, OF MARSHALL, ILLINOIS.

IMPROVED MODE OF PURIFYING RANCID BUTTER.

Specification forming part of Letters Patent No. 96,477, dated November 2, 1869.

*To all whom it may concern:*

Be it known that I, CALVIN PECK, of Marshall, in the county of Clark and State of Illinois, have invented a new and Improved Process for Restoring and Preserving Butter; and I do hereby declare that the following is a full, clear, and exact description thereof, which will enable others skilled in the art to make and use the same.

This invention and discovery relate to a new and useful improvement in a process for purifying and preserving butter, having especial reference to arresting fermentation and restoring and preserving rancid butter; and consists in the process hereinafter described.

In carrying out my process I melt the butter in a clean vessel under a slow and regular heat, and while it is melting I add two ounces of pulverized alum to every five pounds of butter, the butter being stirred gently while melting. When thoroughly melted it is strained through a fine strainer into clean cold water. The butter will rise to the surface quite pure and transparent. The alum coagulates the albumen, the casein, and other foreign matter, all of which are retained in the strainer, leaving the butter perfectly pure and clean, and of uniform consistency.

When the butter is sufficiently cool to be in good working order it is carefully taken out and thoroughly worked, adding to each five pounds of butter three ounces of good dairy salt, and one ounce of clean saltpeter, and one ounce of pure white sugar (pulverized.) The butter is then packed in clean sweet vessels, and is fit for use. By covering it with strong brine and keeping it in a cool place it will remain sweet for any desired length of time.

Having thus described my invention, I claim as new and desire to secure by Letters Patent—

Treating rancid butter by the particular process herein described.

CALVIN PECK.

Witnesses:
C. R. STEELE,
H. C. PARK.